(12) United States Patent
Yano et al.

(10) Patent No.: US 7,986,067 B2
(45) Date of Patent: Jul. 26, 2011

(54) BRUSHLESS MOTOR

(75) Inventors: Tadashi Yano, Ueda (JP); Akihito Fukuzawa, Ueda (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 157 days.

(21) Appl. No.: 12/579,087

(22) Filed: Oct. 14, 2009

(65) Prior Publication Data

US 2010/0090547 A1 Apr. 15, 2010

(30) Foreign Application Priority Data

Oct. 15, 2008 (JP) .................... 2008-266449

(51) Int. Cl.
*H02K 5/00* (2006.01)

(52) U.S. Cl. ................. 310/91; 310/43; 310/89
(58) Field of Classification Search .......... 310/43, 310/89, 91
See application file for complete search history.

(56) References Cited

U.S. PATENT DOCUMENTS

| | | | | |
|---|---|---|---|---|
| 6,664,676 | B1 * | 12/2003 | Yoshida et al. | 310/71 |
| 7,268,461 | B2 * | 9/2007 | Aisenbrey | 310/251 |
| 7,368,840 | B2 * | 5/2008 | Terauchi et al. | 310/68 D |
| 7,652,400 | B2 * | 1/2010 | Oohashi | 310/68 D |
| 7,911,101 | B2 * | 3/2011 | Kimura et al. | 310/93 |
| 2004/0000828 | A1 * | 1/2004 | Kobayashi et al. | 310/91 |
| 2004/0189113 | A1 * | 9/2004 | Kuribara | 310/67 R |
| 2006/0082234 | A1 * | 4/2006 | Tsukamoto | 310/90 |
| 2008/0054735 | A1 * | 3/2008 | Yoshida et al. | 310/43 |
| 2008/0084142 | A1 * | 4/2008 | Ino et al. | 310/68 R |
| 2008/0088191 | A1 * | 4/2008 | Park et al. | 310/71 |

FOREIGN PATENT DOCUMENTS

JP 2000-217324 A 8/2000
* cited by examiner

*Primary Examiner* — Thanh Lam
(74) *Attorney, Agent, or Firm* — Birch, Stewart, Kolasch & Birch, LLP

(57) ABSTRACT

A brushless motor is smaller, flatter, and lighter but is easy to assemble and has reduced motor vibration. An attachment base is integrally molded by two-color extrusion molding using a first resin material that forms a base main portion and a second resin material that forms a support portion and is softer than the first resin material.

6 Claims, 4 Drawing Sheets

BRUSHLESS MOTOR

CROSS-REFERENCE TO RELATED APPLICATIONS

This application is based upon and claims the benefit of priority of the prior Japanese Patent Application No. 2008-266449, filed on 15 Oct. 2008, the entire contents of which are incorporated herein by reference.

FIELD

The present invention relates to a brushless motor used for example in a vehicle air conditioner, a battery cooling apparatus, and the like.

BACKGROUND

As one example, an outer-rotor DC brushless motor used as the driving apparatus of a vehicle air-conditioner will now be described.

A fan is attached to one end of a motor shaft and the other end of the motor shaft passes through a bearing portion ("housing") and is inserted into a substrate-protecting case. A stator is assembled on the bearing portion. A rotor, constructed with a cup-shaped rotor yoke attached to the motor shaft that is rotatably supported by the bearing portion and with magnets attached to an inner circumferential surface of the rotor yoke, is assembled so as to surround the stator.

Also, a sensor magnet is provided on the other end of the motor shaft. The magnetic poles of the sensor magnet are detected by a Hall element mounted on the circuit substrate provided inside the substrate-protecting case so that an excitation current supplied to the motor coil can be switched.

An attachment protruding portion is erected on an end portion of the bearing portion that extends close to the top of the substrate-protecting case. This attachment protruding portion is integrally assembled on the substrate-protecting case with a ring-shaped first rubber vibration insulator positioned and fitted onto a ring-shaped protrusion provided on the substrate-protecting case, a ring-shaped second rubber vibration insulator placed upon the attachment protruding portion, and with a metal ring placed on the second rubber vibration insulator and screwed down. By doing so, vibration of the motor shaft is absorbed by the first and second rubber vibration insulators. This prevents vibration from being transmitted to the substrate-protecting case, which protects the wiring connections on the circuit substrate.

As the first and second rubber vibration insulators described above, butyl rubber (IIR), ethylene-propylene rubber (EPDM) or the like with a hardness of around 40 to 60 as measured by a rubber hardness gauge (JIS K 6253 (ISO 7619); durometer, type A, spring-type) is used (see Patent Document 1).

Patent Document 1
  Japanese Laid-Open Patent Publication No. 2000-217324

SUMMARY

Since the vibration-reducing construction of the substrate-protecting case described above is formed by positioning and screwing together the bearing portion, the case, the first and second rubber vibration insulators, and the metal ring, there is a large number of assembly steps, the assembly process is troublesome, and there are many components. This results in increased manufacturing cost.

Also, in addition to the thickness of the stator and rotor, there is also the thickness of the circuit substrate on which the driving circuit is formed, which means that the motor construction tends to be considerably thick in the axial direction. Since heat-generating components such as transistors are assembled in contact with a heat sink that is exposed to the outside from the substrate-protecting case, sufficient space is required in the axial direction to install the components, and since electronic components that require a comparatively high space, such as an electrolytic capacitor and a choke coil, are also mounted on the circuit substrate, the volume of the substrate-protecting case tends to increase. Since the substrate-protecting case is formed like a box, vibrations tend to be amplified.

When a motor is used in a vehicle air-conditioning apparatus, environmental concerns which call for reductions in overall vehicle weight mean that the motor also needs to be made smaller and lighter. For such an extreme usage environment, reductions in in-vehicle noise and sufficient vibration-proofing countermeasures are also required.

The present invention was conceived to solve the problems described above and it is an object of the present invention to provide a brushless motor that is smaller, flatter, and lighter but is also easy to assemble and has reduced motor vibration.

To achieve the stated object, a brushless motor according to the present invention includes: a rotor; a stator; a cup-shaped bracket; and an attachment base, wherein the bracket is integrally attached onto the attachment base to form a motor case, the rotor and the stator are housed in the motor case, the attachment base includes a base main portion that houses the rotor and the stator and a support portion that supports an opening end portion of the bracket around an entire circumference thereof, and the attachment base is integrally molded by two-color extrusion molding using a first resin material that forms the base main portion and a second resin material that forms the support portion and is softer than the first resin material.

Boss portions may be erected at a plurality of positions in a circumferential direction on the opening end portion of the bracket, and insertion holes into which the boss portions are inserted and positioned may be formed at a plurality of positions on the receiving portion.

A plurality of support protruding portions that receive the opening end surface of the bracket may be erected on a support surface of the support portion.

An erected wall may be erected around an entire outer circumference of the support portion and the attachment base may be attached with the erected wall in contact with an opening end outer circumferential surface of the bracket.

A polymeric resin material with a hardness of 40 to 60 as measured by a rubber hardness gauge (JIS K 6253 (ISO 7619); durometer, type A, spring-type) may be used as the first resin material and an elastomer with a hardness of 25 to 40 may be used as the second resin material.

A motor substrate on which a motor driving circuit is formed may be fixed to the bracket in a space formed in the axial direction between (i) the rotor R and the stator S and (ii) an opening bottom portion of the bracket.

By using the brushless motor described above, the attachment base is formed with a base main portion that houses the rotor and the stator and a receiving portion that receives an opening end portion of the bracket around an entire circumference thereof, and the receiving portion is integrally molded by two-color extrusion molding using a second resin material that is softer than the first resin material that forms the base main portion. Since the attachment base is integrally molded by two-color extrusion molding using resin materials with different hardnesses, there is a reduction in the number of components and assembly is facilitated, which makes manufacturing easier.

Since the support portion that supports the opening end portion of the bracket around the entire circumference thereof is formed using the second resin material that is softer than the first resin material that forms the base main portion, motor vibration (motor excitation noise) that is transmitted to the bracket can be absorbed by the support portion, which makes it difficult for the vibration to be transmitted to the attachment base.

If boss portions are erected at a plurality of positions in a circumferential direction on the opening end portion of the bracket and insertion holes into which the boss portions are inserted and positioned are formed at a plurality of positions on the receiving portion, it is possible to facilitate the positioning of the bracket and the attachment base and to make assembly easier.

If a plurality of support protruding portions that receive the opening end surface of the bracket are erected on a support surface of the support portion, when the bracket is placed on the attachment base, the opening end portion will be supported by the support protruding portions so as to float, and by crushing the support protruding portions, the opening end surface will become supported on the support surface. By supporting the opening end surface using the support portion that is softer than the base main portion, it is possible to absorb not only motor vibrations of the bracket but also errors during assembly.

If an erected wall is erected around an entire outer circumference of the support portion and the attachment base is attached with the erected wall in contact with an opening end outer circumferential surface of the bracket, the support portion that is soft will make tight contact with the range from the opening end portion to the outer circumferential surface, which improves the sealing of the motor case that is closed by the bracket and the attachment base and also the vibration-proofing.

If a polymeric resin material with a hardness of 40 to 60 as measured by a rubber hardness gauge (JIS K 6253 (ISO 7619); durometer, type A, spring-type) is used as the first resin material and an elastomer with a hardness of 25 to 40 is used as the second resin material, it will be possible to realize a vibration-proofing construction for a motor where there is improved vibration absorption and sealing by the support portion and favorable weather-resistance while maintaining the strength of the base main portion.

Also, if a motor substrate on which a motor driving circuit is formed is fixed to the bracket in a space formed in the axial direction between (i) the rotor R and the stator S and (ii) an opening bottom portion of the bracket, it will be possible to protect the motor substrate that is fixed to the bracket from vibration and thereby maintain the reliability of the wiring connections. Since the motor case is miniaturized by miniaturizing and flattening the motor in the axial direction, it will also be possible to reduce the amplitude of the motor vibrations.

DESCRIPTION OF EMBODIMENTS

A preferred embodiment of a brushless motor will now be described with reference to the attached drawings. The present embodiment will be described by way of a fan motor (i.e., an outer-rotor DC brushless motor) for use in a vehicle.

The overall construction of a brushless motor will now be described with reference to FIGS. 1 to 4.

Figure 1:
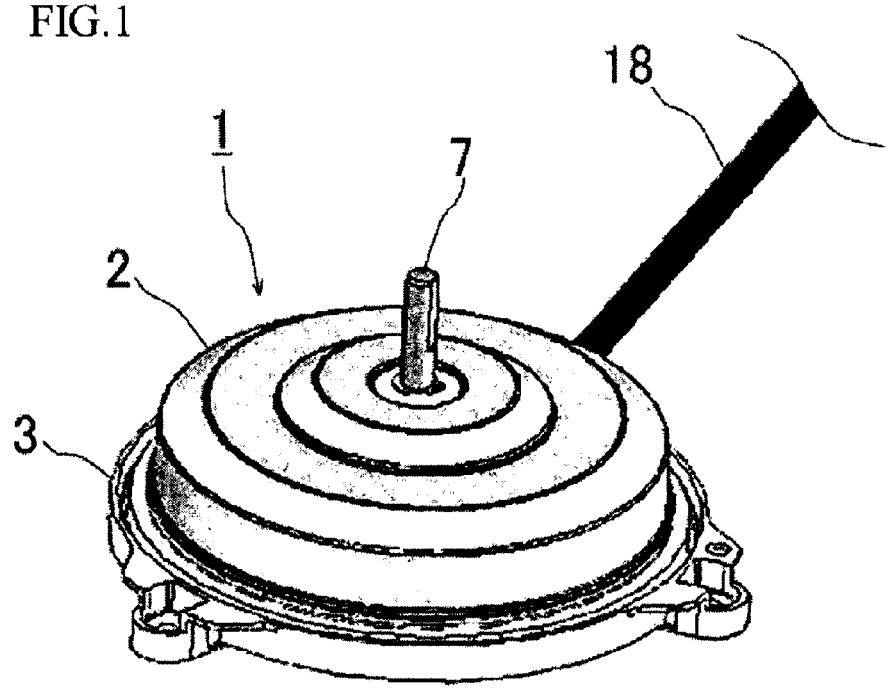
FIG. 1 is a perspective view of a brushless motor from which a fan has been removed.
Figure 2:
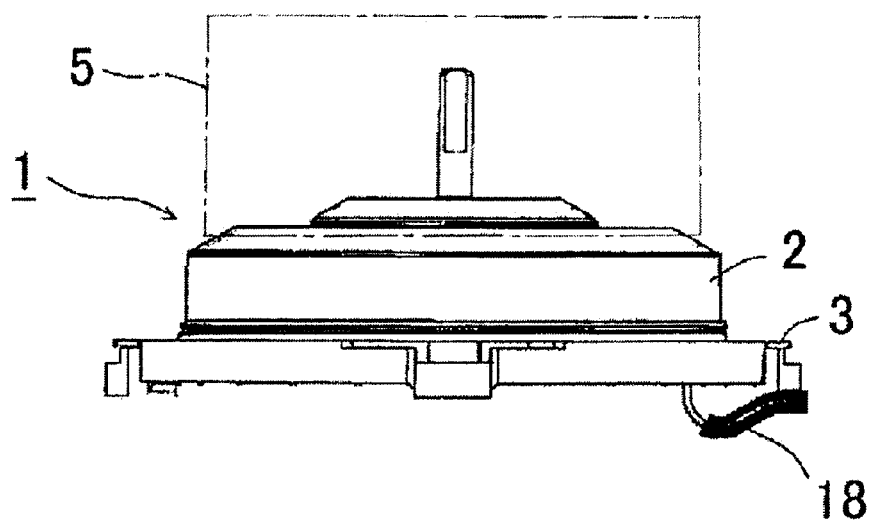
FIG. 2 is a front view of the brushless motor depicted in FIG. 1.

As depicted in FIG. 1 and FIG. 2, a brushless motor 1 is produced by integrally assembling a cup-shaped bracket 2 and an attachment base 3. A fan (impeller) 5 is integrally attached to one end of a motor shaft, described later, in the periphery of the bracket 2. When the fan 5 rotates, air is drawn from a central part in the axial direction and expelled outward.

Figure 3:
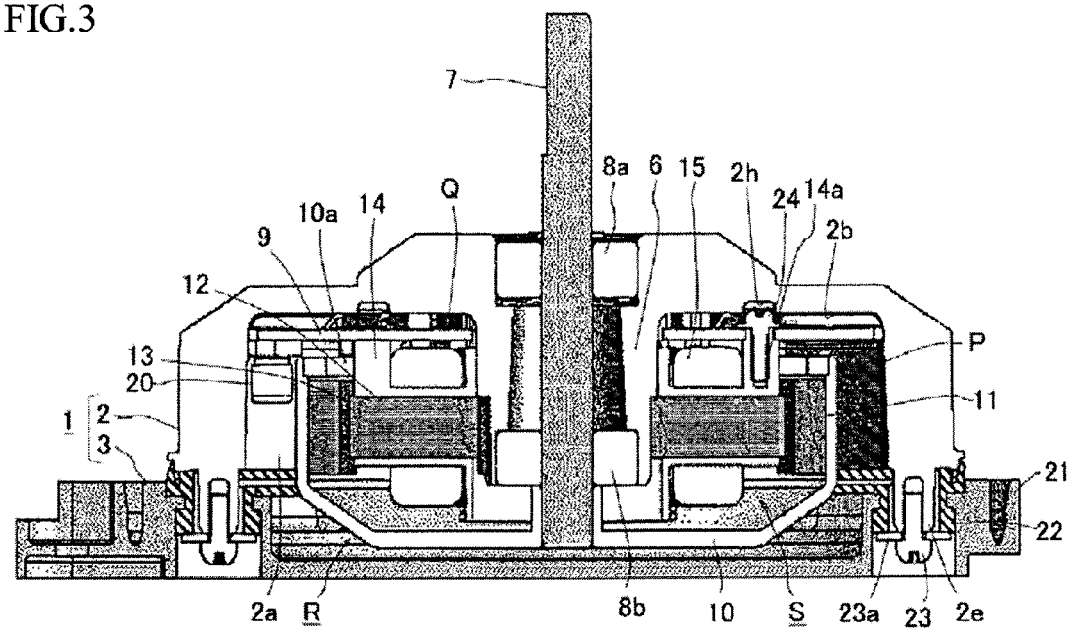
FIG. 3 is a cross-sectional view of the brushless motor from which the fan has been removed.

As depicted in FIG. 3, a hollow cylindrical portion 6 is provided so as to protrude into the center of a bracket opening 2a of the cup-shaped bracket 2. Inside the hollow cylindrical portion 6, a motor shaft 7 is rotatably supported via bearing portions (ball bearings, sleeve bearings, or the like) 8a, 8b. The bracket 2 serves as both the rotor bearing portion and the motor case. Aside from an aluminum die-cast product (foundry product) that is lightweight and favorably dissipates heat, it is possible to use cold-rolled steel sheet (SPCC) or the like. A rotor R and a stator S are housed inside a closed space P that is formed by using a bracket 2 that constructs the exterior of the motor to cover the attachment base 3.

In FIG. 3, a ring-shaped stator core 12 is attached onto an outer circumferential surface of the hollow cylindrical portion 6 that is formed on the opening bottom portion 2b of the bracket 2. Teeth portions 13 are provided on the stator core 12 so as to point inward in the radial direction and each tooth portion 13 is insulated by being covered with an insulator 14. Magnet wire 15 is wound around each tooth portion 13.

A motor substrate (PWB) 9 on which a motor driving circuit is formed is fixed in a space Q formed in the axial direction between (i) the rotor R and the stator S and (ii) the opening bottom portion 2b of the bracket 2 by fitting fixing screws 24 into screw holes 14a of the insulator 14. Clearance concave portions 2h that accommodate head portions of screws are formed in the opening bottom portion 2b of the bracket 2. Note that although the motor substrate 9 is fixed to the insulator 14, it is also possible to provide bosses on the opening bottom portion 2b of the bracket 2 and to screw the motor substrate 9 directly to the bracket 2. Also, although the motor substrate 9 may be fixed to the hollow cylindrical portion 6, to prevent vibration at an outer edge portion of the substrate, fixing the motor substrate 9 at the outer edge portion thereof is preferable.

Since the motor substrate 9 can be fixed both as close as possible to the opening bottom portion 2b of the bracket 2 and within a range in the axial direction inside the motor case surrounded by the bracket 2 and the attachment base 3 that construct the exterior of the motor, it is possible to miniaturize and flatten the brushless motor 1 in the axial direction and to reduce the weight of the brushless motor 1.

In FIG. 3, electronic components (as examples, a choke coil and an electrolytic capacitor 20) that are comparatively high are disposed on the motor substrate 9 in a free space formed in the bracket opening 2a close to the outer edge on the outside of the rotor yoke 10 in the radial direction. By doing so, it is possible to accommodate the height of the substrate-mounted components in the axial direction using free space inside the bracket opening 2a, which makes it possible to further flatten the motor (i.e., to make the motor slimmer).

Magnets 11 are joined with adhesive to an inner circumferential surface of a cup-shaped rotor yoke 10 of the rotor R. A center portion of the rotor yoke 10 and the other end of the motor shaft 7 are integrally combined. The rotor R is rotatably assembled on the bracket 2 with a rotor yoke opening 10a facing the opening bottom portion 2b of the bracket 2 and with the motor shaft 7 supported via the bearing portions 8a, 8b on the hollow cylindrical portion 6 formed on the opening bottom portion 2b of the bracket 2. Since the stator S is disposed in a space formed by housing the rotor yoke 10 inside the bracket opening 2a so that the rotor yoke opening 10a faces the opening bottom portion 2b, it is possible to reduce the height of the brushless motor 1 in the axial direction in spite of the brushless motor 1 being an outer-rotor motor.

External wiring 18 is connected to the motor substrate 9 (see FIGS. 1 and 2). The external wiring 18 extends outside the motor via a grommet (not illustrated) that is fitted into a through-hole provided in the attachment base 3. By including an earth wire in the external wiring 18, it is also possible to externally ground the motor substrate 9.

As described above, since the motor substrate 9 is disposed within the area of the opening bottom portion 2b of the bracket opening 2a and within the height range in the axial direction inside the case that is closed and surrounded by the bracket 2 and the attachment base 3, it is possible to miniaturize and flatten the motor in the axial direction and to reduce the weight of the motor.

For an outer-rotor brushless motor with an output of around 50 W, for example, it is possible to achieve a reduction in the total height of the bracket 2 and the attachment base 3 in the axial direction to around half and a reduction in weight to between around ⅔ and ½.

The construction of the attachment base 3 will now be described in detail with reference to FIGS. 4 to 7.

Figure 5:
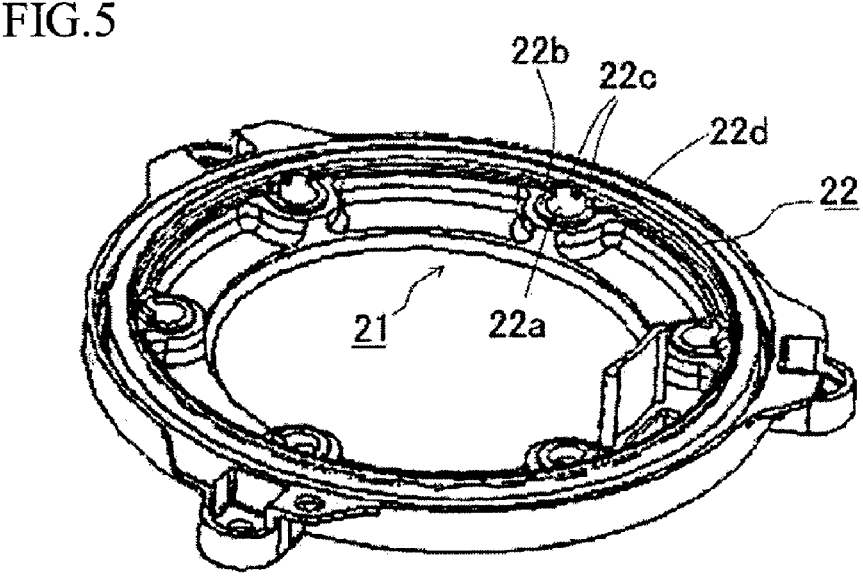
FIG. 5 is a perspective view of the attachment base.

The attachment base 3 depicted in FIG. 5 includes a base main portion 21 that houses the rotor R and the stator S and a ring-shaped support portion 22 that supports an opening end portion 2d of the bracket 2 around an entire circumference thereof.

Figure 6:
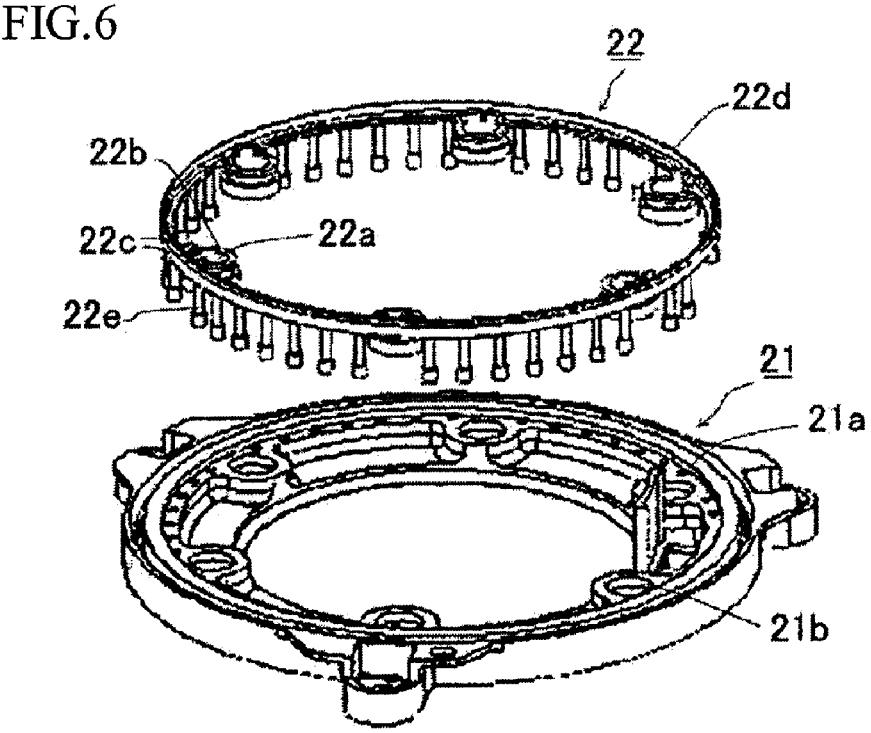
FIG. 6 is an exploded perspective view of a base main portion and a support portion.

In FIG. 6, the support portion 22 is formed by two-color extrusion molding by insert molding or outsert molding, for example, a second resin material that is softer than a first resin material that forms the base main portion 21. More specifically, a polymeric resin material (polypropylene) with a hardness of 40 to 60 as measured by a rubber hardness gauge (JIS K 6253 (ISO 7619); durometer, type A, spring-type) is used as the first resin material and an elastomer with a hardness of 25 to 40 is favorably used as the second resin material. After the base main portion 21 has been injection molded using the first resin material using a shaping die, not illustrated, the die is changed and the support portion 22 is injection molded using the second resin material. By doing so, the attachment base 3 is integrally molded by two-color extrusion molding. When doing so, since the second resin material favorably sticks to the first resin material, the base main portion 21 and the support portion 22 are integrally molded with molding holes 21a filled by filling portions 22e.

Figure 4:
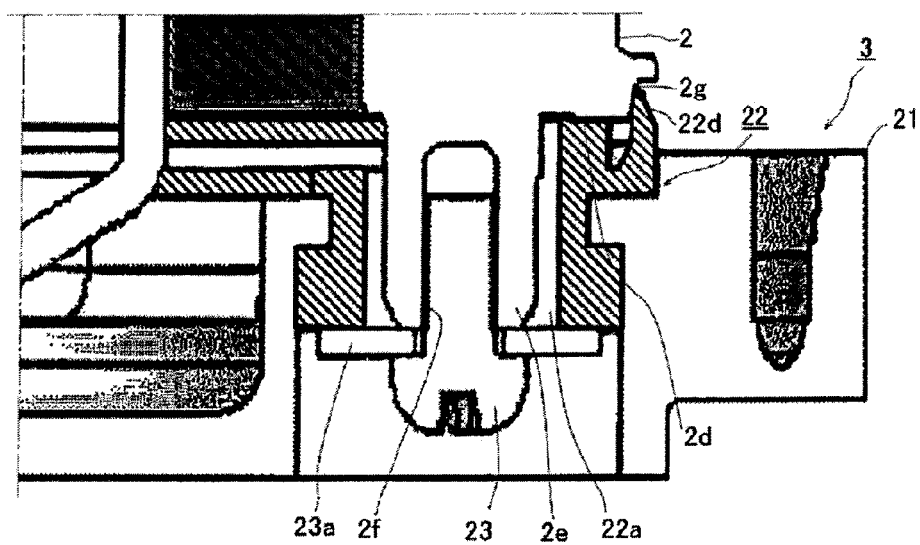
FIG. 4 is an enlarged cross-sectional view of a portion where a bracket and an attachment base are fixed.

Also, as depicted in FIG. 4, boss portions 2e are erected on the opening end portion 2d of the bracket 2 at a plurality of positions around the circumference. Screw holes 2f are formed in the boss portions 2e. Insertion holes 22a into which the boss portions 2e are inserted to position the boss portions 2e are also formed at a plurality of positions in the support portion 22. The insertion holes 22a are integrally molded so as to cover the inner circumferential surfaces of the insertion holes 21b.

The bracket 2 is placed upon the attachment base 3 with the boss portions 2e inserted into and positioned by the insertion holes 22a. Fixing screws 23 are screwed into the screw holes 2f of the boss portions 2e that are exposed from the insertion holes 21b of the base main portion 21 with washers 23a in between to integrally attach the bracket 2 and the attachment base 3.

Figure 7A:
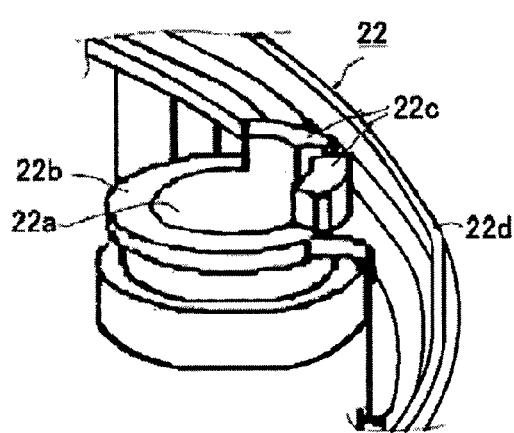
FIGS. 7A and 7B are a perspective view and a front view of the support portion that supports a bracket opening end portion.
Figure 7B:
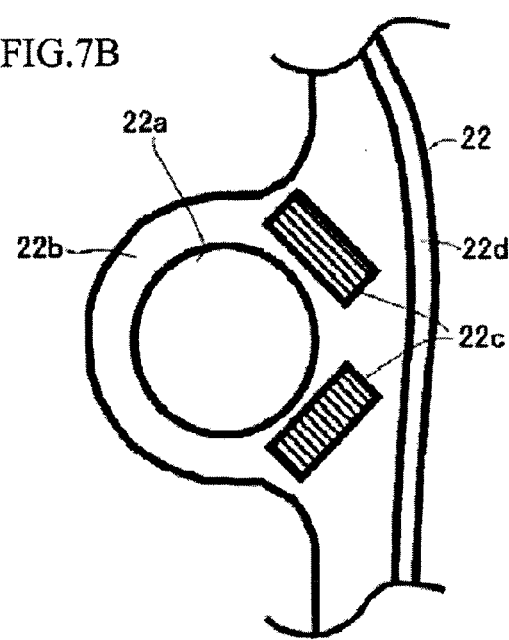

Also, as depicted in FIGS. 7A and 7B, a plurality of support protruding portions 22c that receive the opening end portion 2d of the bracket 2 are erected on the support surface 22b of the support portion 22. In FIG. 3, when the bracket 2 has been placed upon the attachment base 3, the edge portion 2d will be supported by the support protruding portions 22c so as to float, but when the attachment base 3 is tightened using the fixing screws 23, the support protruding portions 22c are crushed and the opening end portion 2d will become supported on the support surface 22b. In this way, since the bracket 2 is supported by the support portion 22 that is softer than the base main portion 21, it is possible to absorb not only motor vibrations of the bracket 2 but also errors during assembly. Although the support protruding portions 22c are provided around the outer circumferences of the insertion holes 22a, the support protruding portions 22c may be provided along an erected wall 22d.

Also, as depicted in FIGS. 7A and 7B, the erected wall 22d is formed so as to be erected around the entire outer circumference of the support portion 22 and the bracket 2 and the attachment base 3 are attached so that the erected wall 22d contacts an opening end outer circumferential surface 2g of the opening of the bracket 2. By doing so, as depicted in FIG. 4, the support portion 22 that is soft will make tight contact with the range from the opening end portion 2d of the bracket 2 to the outer circumferential surface 2g, which improves the sealing of the motor case that is closed by the bracket 2 and the attachment base 3 and also the vibration-proofing.

By forming the attachment base 3 by two-color molding using a polymeric resin material with a hardness of 40 to 60 as the first resin material and an elastomer with a hardness of 25 to 40 as the second resin material, it is possible to realize a vibration-proofing construction for a motor where there is improved vibration absorption and sealing by the support portion and favorable weather-resistance while maintaining the strength of the base main portion. This means it is possible to provide a motor that is sufficiently water-resistant and vibration-proof to withstand an extreme usage environment where the motor is fitted in a vehicle.

Although a fan motor that is mounted in a vehicle is described in the above embodiment, the present invention is not limited to such, and it is also possible to apply the present invention to apparatuses aside from air conditioners. Also, the present invention is not limited to an outer-rotor brushless motor and can also be applied to an inner-rotor brushless motor where the motor substrate is disposed between the rotor and stator and the bracket.

What is claimed is:

1. A brushless motor comprising:

a rotor;

a stator;

a cup-shaped bracket; and an attachment base, wherein the bracket is integrally attached onto the attachment base to form a motor case, the rotor and the stator are housed in the motor case, the attachment base includes a base main portion that houses the rotor and the stator and a support portion that supports an opening end portion of the bracket around an entire circumference thereof, and the attachment base is integrally molded by two-color extrusion molding using a first resin material that forms the base main portion and a second resin material that forms the support portion and is softer than the first resin material.

2. A brushless motor according to claim 1, wherein boss portions are erected at a plurality of positions in a circumferential direction on the opening end portion of the bracket, and insertion holes into which the boss portions are inserted and positioned are formed at a plurality of positions on the support portion.

3. A brushless motor according to claim 1, wherein a plurality of support protruding portions that receive the opening end portion of the bracket are erected on a support surface of the support portion.

4. A brushless motor according to claim 1, wherein an erected wall is erected around an entire outer circumference of the support portion and the attachment base is attached with the erected wall in contact with an opening end outer circumferential surface of the bracket.

5. A brushless motor according to claim 1, wherein a polymeric resin material with a hardness of 40 to 60 as measured by a rubber hardness gauge (JIS K 6253 (ISO 7619); durometer, type A, spring-type) is used as the first resin material and an elastomer with a hardness of 25 to 40 is used as the second resin material.

6. A brushless motor according to claim 1, wherein a motor substrate on which a motor driving circuit is formed is fixed to the bracket in a space formed in the axial direction between (i) the rotor and the stator and (ii) an opening bottom portion of the bracket.

* * * * *